(12) United States Patent
Zhang et al.

(10) Patent No.: US 11,353,049 B2
(45) Date of Patent: Jun. 7, 2022

(54) RIVET STRUCTURE

(71) Applicant: Fulian Precision Electronics (Tianjin) Co., LTD, Tianjin (CN)

(72) Inventors: Chang-You Zhang, Tianjin (CN); Li-Chao Ji, Tianjin (CN); Tian-Yu Zhang, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 212 days.

(21) Appl. No.: 16/379,328

(22) Filed: Apr. 9, 2019

(65) Prior Publication Data

US 2020/0284281 A1    Sep. 10, 2020

(30) Foreign Application Priority Data

Mar. 8, 2019 (CN) .......................... 201910176847.8

(51) Int. Cl.
*F16B 5/04* (2006.01)
*F16B 5/00* (2006.01)
*F16B 17/00* (2006.01)
*B21D 39/03* (2006.01)

(52) U.S. Cl.
CPC ............ *F16B 5/045* (2013.01); *B21D 39/032* (2013.01); *B21D 39/038* (2013.01); *F16B 5/0096* (2013.01); *F16B 17/008* (2013.01)

(58) Field of Classification Search
CPC ...... F16B 5/045; F16B 5/0096; F16B 17/008; F16B 5/04; F16B 19/06; F16B 11/002; B21D 39/032; B21D 39/038
See application file for complete search history.

(56) References Cited

U.S. PATENT DOCUMENTS

| 4,859,378 A * | 8/1989 | Wolcott | ................ B29C 65/606 |
| | | | 264/445 |
| 5,086,997 A * | 2/1992 | Glass | .................. B29C 66/7392 |
| | | | 244/123.3 |
| 8,061,922 B2 * | 11/2011 | Webb | ...................... G06F 1/183 |
| | | | 403/242 |
| 10,531,589 B2 * | 1/2020 | Zou | ........................ F16B 5/0096 |
| 2013/0219687 A1 * | 8/2013 | Wang | .................... F16B 37/068 |
| | | | 29/505 |

(Continued)

FOREIGN PATENT DOCUMENTS

CN              2613884 Y        4/2004
DE       102016116354 A1 *     3/2018     ........... B21D 39/032

*Primary Examiner* — Matthew R McMahon
(74) *Attorney, Agent, or Firm* — ScienBiziP, P.C.

(57) ABSTRACT

A rivet structure includes a female rivet plate and a male rivet plate. The female rivet plate defines an elongated countersunk hole. A size of the countersunk hole increases from a first side of the female rivet plate to a second side of the female rivet plate. The male rivet plate includes a rivet including a shaft portion and two head portions. The shaft portion extends from the male rivet plate. The two head portions are respectively arranged on opposite sides of the shaft portion on a side of the shaft portion facing away from the male rivet plate. The two head portions extend through the countersunk hole from the first side of the female rivet plate to the second side of the female rivet plate. The two head portions are configured to be stamped by a stamping member to fill in the countersunk hole.

10 Claims, 4 Drawing Sheets

(56) References Cited

U.S. PATENT DOCUMENTS

| | | | |
|---|---|---|---|
| 2016/0032982 A1* | 2/2016 | Lu ........................ | B21D 39/038 464/68.1 |
| 2016/0053797 A1* | 2/2016 | Chen ...................... | A47B 96/04 411/502 |
| 2020/0206803 A1* | 7/2020 | Huang ................ | H01L 23/3672 |

* cited by examiner

RIVET STRUCTURE

FIELD

The subject matter herein generally relates to rivet structures, and more particularly to a rivet structure of a server.

BACKGROUND

Servers generally require partition plates to partition space inside the server. The partition plates are generally mounted together by a rivet structure. The commonly used rivet structures require a bent structure, which occupies more space. Stamping and forming processes of the rivet structure are complicated and may increase cost.

BRIEF DESCRIPTION OF THE DRAWINGS

Implementations of the present disclosure will now be described, by way of embodiments, with reference to the attached figures.

DETAILED DESCRIPTION

Figure 1:
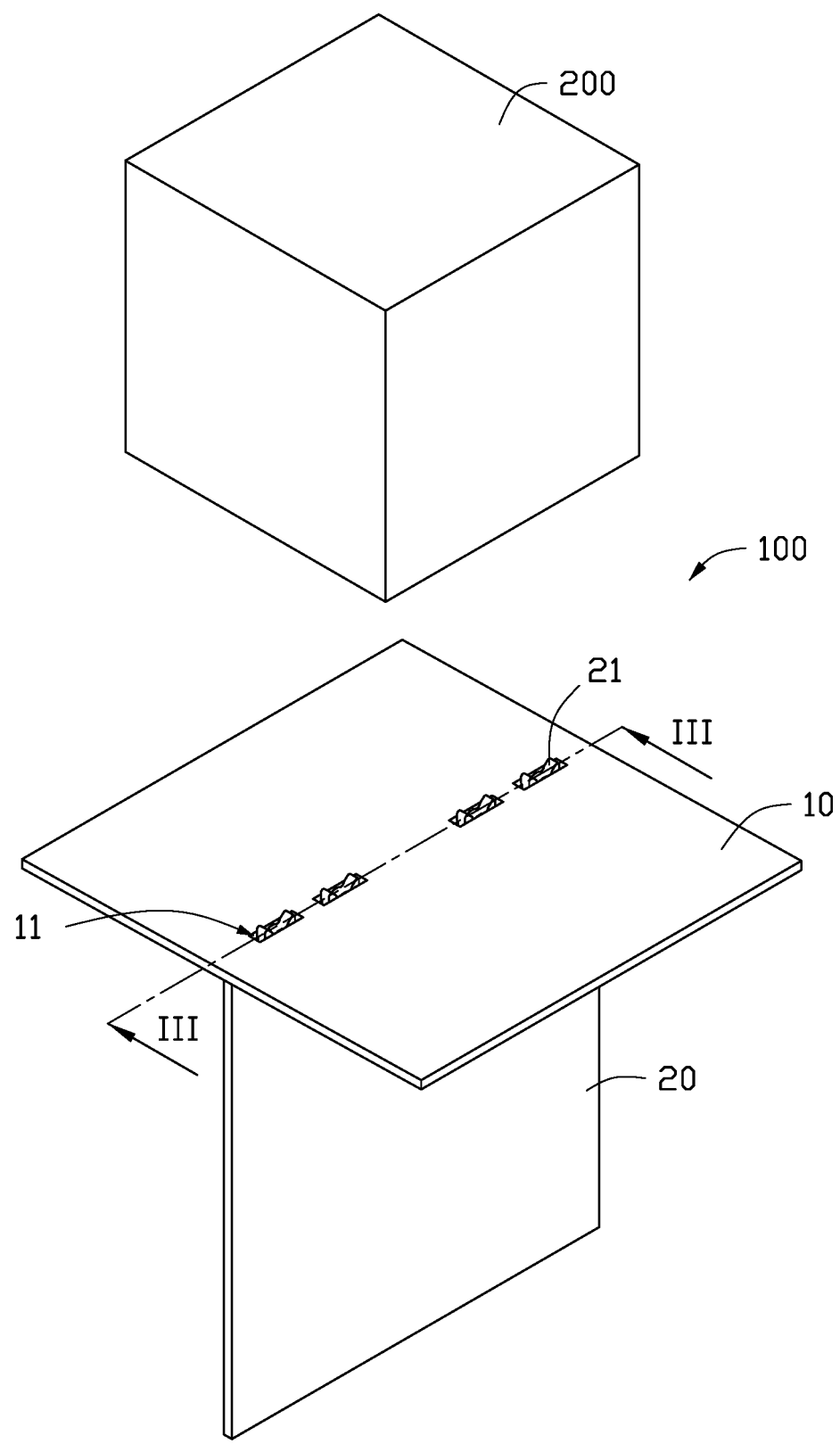
FIG. 1 is an assembled, isometric view of an embodiment of a rivet structure and a stamping member.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a riveting structure 100 capable of riveting two components together in a fan partition, a hard disk partition, and the like inside a server. The riveting structure 100 includes a female rivet plate 10 and a male rivet plate 20. The female rivet plate 10 defines a plurality of elongated countersunk holes 11 each configured to receive a corresponding rivet 21. The rivet 21 is inserted into the countersunk hole 11, and then the rivet 21 is flattened in the countersunk hole 11 by a stamping member 200 on a side of the female rivet plate 10 facing away from the male rivet plate 20. In one embodiment, the female rivet plate 10 defines four countersunk holes 11 in a straight line. The male rivet plate 20 correspondingly includes four rivet heads 21 arranged in a straight line, but is not limited thereto. In one embodiment, the female rivet plate 10 and the male rivet plate 20 are sheet metal materials, but are not limited thereto.

Figure 2:
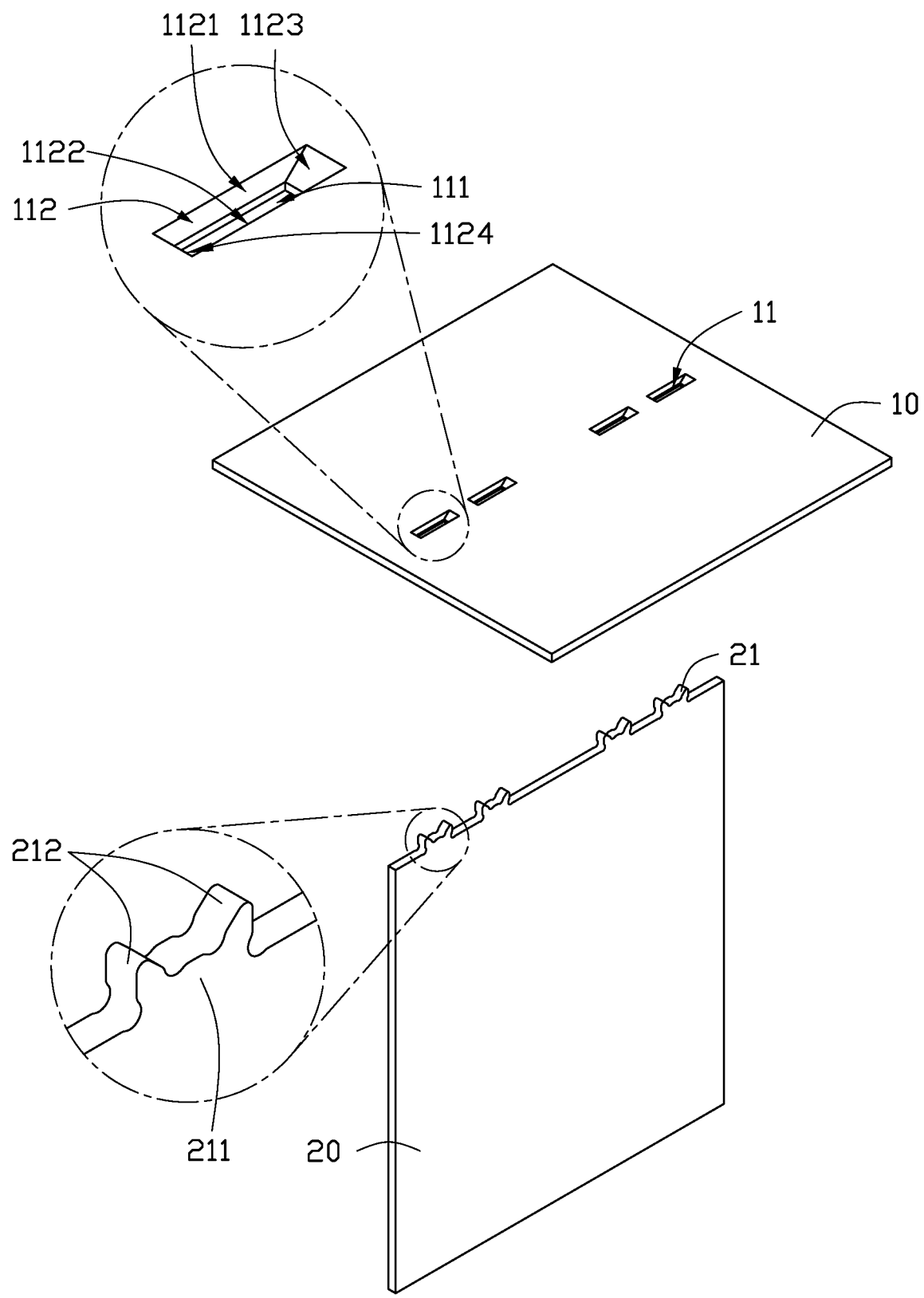
FIG. 2 is an exploded, isometric view of the rivet structure in FIG. 1.
Figure 4:
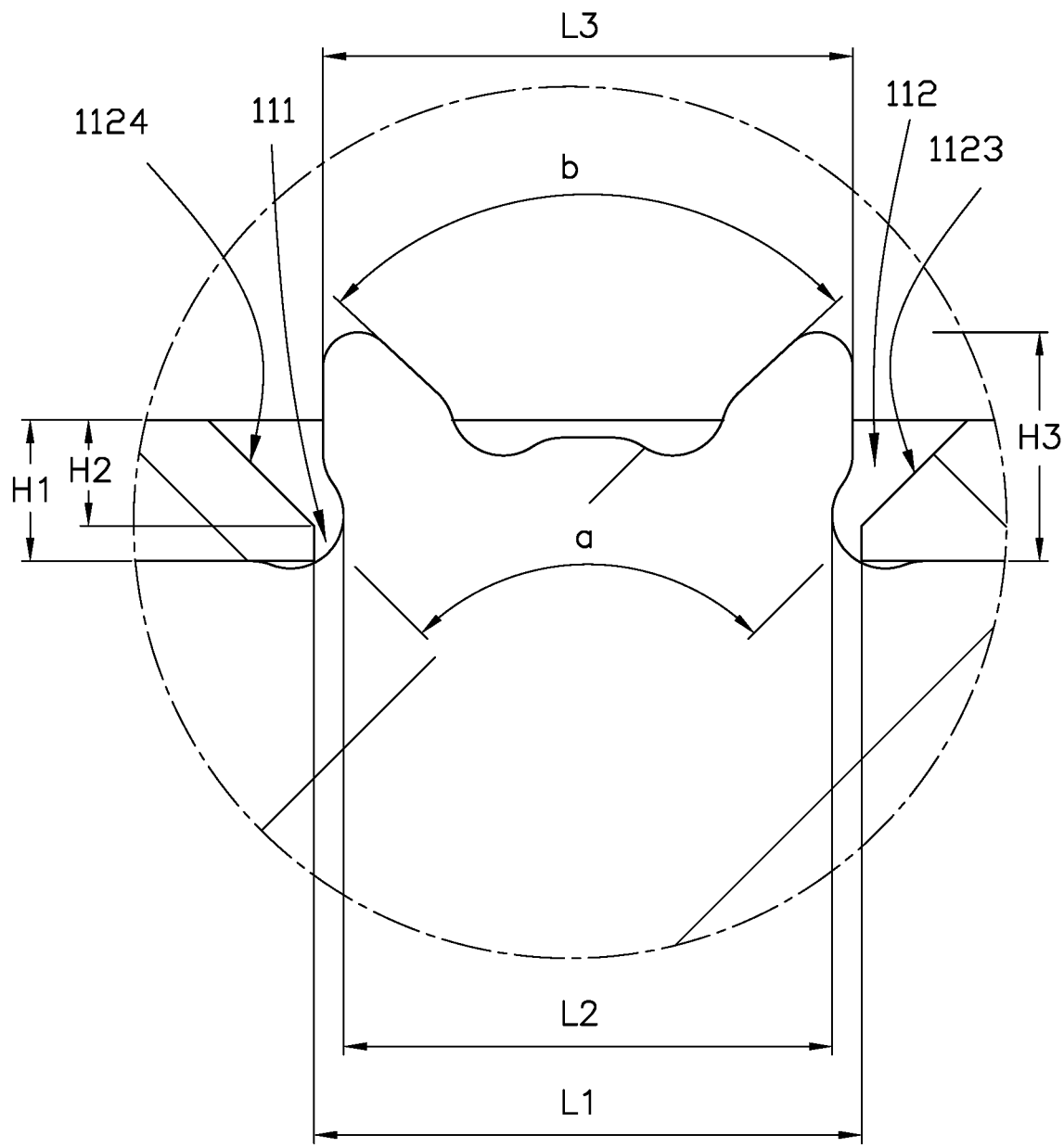
FIG. 4 is a close-up view of a circled portion IV-IV in FIG. 3.

Referring to FIG. 2 and FIG. 4, the countersunk hole 11 includes a communication hole 111 and a fixing hole 112. A cross-sectional shape of the communication hole 111 is substantially rectangular, and a cross-sectional shape of the fixing hole 112 is substantially isosceles trapezoidal. The communication hole 111 and the fixing hole 112 are respectively defined on opposite sides of the female rivet plate 10 and communicate with each other. An opening of the communication hole 111 and an opening of the fixing hole 112 are substantially rectangular shaped. The communication hole 111 is defined on a side of the female rivet plate 10 adjacent to the male rivet plate 20. The fixing hole 112 is larger than the communication hole and is defined on a side of the female rivet plate 10 facing away from the male rivet plate 20. The countersunk hole 11 includes a first inner wall 1121, a second inner wall 1122, a third inner wall 1123, and a fourth inner wall 1124. The first inner wall 1121 is opposite to the second inner wall 1122, and the third inner wall 1123 is opposite to the fourth inner wall 1124. The first inner wall 1121, the second inner wall 1122, the third inner wall 1123, and the fourth inner wall 1124 are angled outwardly in a direction from the communication hole 111 to the fixing hole 112.

In one embodiment, the female rivet plate 10 has a total height (thickness) H1 of 0.8 mm. The female rivet plate 10 has a height H2 of 0.6 mm defined by opposite ends of the first inner wall 1121, the second inner wall 1122, the third inner wall 1123, and the fourth inner wall 1124. The communication hole 111 has a length L1 of 3.1 mm and a width of 0.9 mm. The communication hole 111 extends 0.2 mm perpendicularly to an end of the first inner wall 1121, the second inner wall 1122, the third inner wall 1123, and the fourth inner wall 1124. Two adjacent countersunk holes 11 form a group, and a distance between the two communication holes 111 of the two adjacent countersunk holes 11 is 3.3 mm. The fixing hole 112 extends along the height H2. An interior angle formed between the first inner wall 1121 and the second inner wall 1122 is 90°, and an interior angle a formed between the third inner wall 1123 and the fourth inner wall 1124 is 90°.

Figure 3:
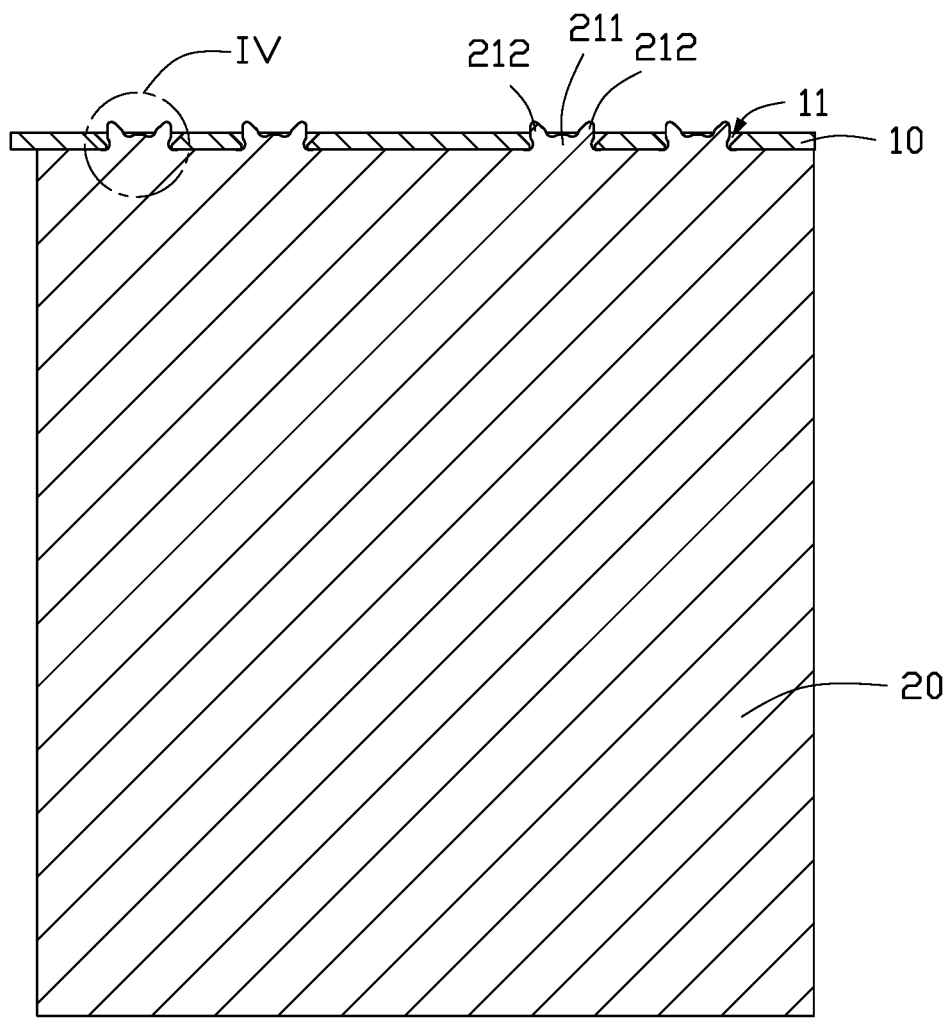
FIG. 3 is a cross-sectional view taken along line III-III in FIG. 1.

Referring to FIG. 2 and FIG. 3, the rivet 21 protrudes from one side of the male rivet plate 20. In one embodiment, the rivet 21 and the male rivet plate 20 are integrally formed by stamping a raw material plate. The rivet 21 includes a shaft portion 211 and two head portions 212. The shaft portion 211 extends from the male rivet plate 20. A cross-section of each of the two head portions 212 is substantially V-shaped. The two head portions 212 are respectively arranged on opposite sides of the shaft portion 211 on a side of the shaft portion 211 facing away from the male rivet plate 20.

Referring to FIG. 4, in one embodiment, a length L2 of the shaft portion 211 is 3 mm. A distance between the shaft portions 211 of adjacent two rivet heads 21 is 3.4 mm. An angle b between inner sides of the two head portions 212 of the rivet 21 is 94°. Outer sides of the two head portions 212 are substantially parallel. A distance L3 between the outer sides of the two head portions 212 is between L1 and L2. A height H3 from a zenith of the head portion 212 to the male rivet plate 20 is 1.3 mm.

When riveting, the rivet 21 is inserted into the countersunk hole 11 so that the head portions 212 pass through the communication hole 111 and the fixing hole 112, the shaft portion 211 is received in the countersunk hole 11, and the male rivet plate 20 abuts against the female rivet plate 10. Then, the stamping member 200 stamps the head portions 212 in a direction perpendicular to a surface of the female rivet plate 10 facing away from the male rivet plate 20, so that the two head portions 212 of the rivet 21 are deformed to fill in the countersunk hole 11.

In other embodiments, size dimensions and configurations of the rivet 21 and the countersunk hole 11 may be adjusted according to the height of the female rivet plate 10.

When the riveting structure 100 is riveted, only the stamping member 200 is required for stamping the head portions 212 to fill in the countersunk hole 11. The riveting structure 100 has a simple structure, is simple and has a reduced cost to mold, and has a large load-bearing strength. Thus, a use of space inside a server using the riveting structure 100 is effectively improved, and a riveting appearance is improved. Moreover, since the female rivet plate 10 and the male rivet plate 20 have a simple structure and are cheap to produce, a yield and production efficiency thereof are greatly improved, and a cost of manufacture is reduced. A pressure required for riveting is small, but a load-bearing strength after riveting is large. The small pressing force prevents deformation caused by excessive riveting pressure, which can better guarantee positioning accuracy.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A rivet structure comprising:
a female rivet plate; and
a male rivet plate; wherein:
the female rivet plate defines at least one elongated countersunk hole;
a size of the countersunk hole increases from a first side of the female rivet plate to a second side of the female rivet plate, the first side being opposite to the second side;
the male rivet plate comprises at least one rivet each comprising a shaft portion and two head portions;
the shaft portion extends from the male rivet plate;
the two head portions are respectively arranged on opposite sides of the shaft portion on a side of the shaft portion facing away from the male rivet plate;
the two head portions extend through the countersunk hole from the first side of the female rivet plate to the second side of the female rivet plate, each head portion is V-shaped, and has a tip facing away from the male rivet plate, the tip of one of the head portions is independent from the tip of the other one of the head portions, an angle between inner sides of the two head portions of the rivet is 94 degrees;
the two head portions are configured to be stamped to fill in the countersunk hole.

2. The rivet structure of claim 1, wherein:
the countersunk hole comprises a communication hole and a fixing hole;
a cross-sectional shape of the communication hole taken along a length of the communication hole is rectangular;
a cross-sectional shape of the fixing hole taken along a length of the fixing hole is isosceles trapezoidal;
the communication hole and the fixing hole are respectively defined on opposite sides of the female rivet plate and communicate with each other;
an opening of the communication hole and an opening of the fixing hole are rectangular-shaped;
a size of the fixing hole is larger than a size of the communication hole.

3. The rivet structure of claim 2, wherein:
the countersunk hole comprises a first inner wall, a second inner wall opposite to the first inner wall, a third inner wall, and a fourth inner wall opposite to the third inner wall;
an interior angle formed between the first inner wall and the second inner wall is 90 degrees;
an interior angle formed between the third inner wall and the fourth inner wall is 90 degrees.

4. The rivet structure of claim 3, wherein:
a total height of the female rivet plate is 0.8 mm;
a height of the female rivet plate defined by opposite ends of the first inner wall, the second inner wall, the third inner wall, and the fourth inner wall is 0.6 mm;
the communication hole extends 0.2 mm perpendicularly to an end of the first inner wall, the second inner wall, the third inner wall, and the fourth inner wall.

5. The rivet structure of claim 4, wherein:
a length and a width of the communication hole are 3.1 mm and 0.9 mm, respectively;
a distance between the two communication holes of two adjacent countersunk holes is 3.3 mm.

6. The rivet structure of claim 5, wherein:
a length of the shaft portion is 3 mm;
a distance between the shaft portions of two adjacent rivet heads is 3.4 mm.

7. The rivet structure of claim 6, wherein:
outer sides of the two head portions are parallel to each other;
a distance between the outer sides of the two head portions is between the length of the communication hole and the length of the shaft portion.

8. The rivet structure of claim 7, wherein:
a height from a zenith of the head portion to the male rivet plate is 1.3 mm.

9. The rivet structure of claim 1, wherein:
the rivet and the male rivet plate are integrally formed by stamping.

10. The rivet structure of claim 1, wherein:
the female rivet plate and the male rivet plate are made of sheet metal.

* * * * *